United States Patent
Negi et al.

(10) Patent No.: US 10,056,083 B2
(45) Date of Patent: Aug. 21, 2018

(54) METHOD AND SYSTEM FOR PROCESSING MULTIMEDIA CONTENT TO DYNAMICALLY GENERATE TEXT TRANSCRIPT

(71) Applicant: YEN4KEN, INC., Princeton, NJ (US)

(72) Inventors: Sumit Negi, Bangalore (IN); Sonal S Patil, Dhule (IN); Arijit Biswas, Kolkata (IN); Ankit Gandhi, Raipur (IN); Om D Deshmukh, Bangalore (IN)

( * ) Notice: Subject to any disclaimer, the term of this patent is extended or adjusted under 35 U.S.C. 154(b) by 0 days.

(21) Appl. No.: 15/296,140

(22) Filed: Oct. 18, 2016

(65) Prior Publication Data

US 2018/0108354 A1    Apr. 19, 2018

(51) Int. Cl.
| | | |
|---|---|---|
| G10L 15/00 | (2013.01) | |
| G10L 15/26 | (2006.01) | |
| G10L 15/18 | (2013.01) | |
| G10L 15/187 | (2013.01) | |
| G10L 15/30 | (2013.01) | |
| G10L 15/08 | (2006.01) | |

(52) U.S. Cl.
CPC ............ *G10L 15/26* (2013.01); *G10L 15/187* (2013.01); *G10L 15/1815* (2013.01); *G10L 15/30* (2013.01); *G10L 2015/088* (2013.01)

(58) Field of Classification Search
USPC ........................................... 704/9, 205, 235
See application file for complete search history.

(56) References Cited

U.S. PATENT DOCUMENTS

| | | | | |
|---|---|---|---|---|
| 6,243,676 B1 * | 6/2001 | Witteman | ......... | G06F 17/30017 |
| | | | | 704/243 |
| 7,636,657 B2 * | 12/2009 | Ju | ......... | G10L 15/193 |
| | | | | 704/10 |

(Continued)

FOREIGN PATENT DOCUMENTS

| | | |
|---|---|---|
| EP | 0336032 A1 | 10/1989 |
| EP | 1126436 A2 | 8/2001 |

OTHER PUBLICATIONS

"A dynamic language model based on individual word domains", E. I. Sicilia Garcia et.al. , 2006.

(Continued)

*Primary Examiner* — Michael Colucci
(74) *Attorney, Agent, or Firm* — LeonardPatel PC

(57) ABSTRACT

The disclosed embodiments illustrate method and system of processing multimedia content to generate a text transcript. The method includes segmenting each of a set of text frames to determine spatial regions. The method further includes extracting one or more keywords from each of the determined spatial regions. The method further includes determining the first set of keywords from the extracted one or more keywords based on filtering of one or more off-topic keywords from the extracted one or more keywords. The method further includes extracting a second set of keywords based on the determined first set of keywords. The method further includes generating a graph between each of a first set of keywords and one or more of a second set of keywords. The method further includes dynamically generating the text transcript of audio content in the multimedia content based on the generated graph.

11 Claims, 6 Drawing Sheets

(56) References Cited

U.S. PATENT DOCUMENTS

| | | | | | |
|---|---|---|---|---|---|
| 8,195,650 | B2* | 6/2012 | Sheshagiri | ........ | G06F 17/30796 707/722 |
| 8,484,017 | B1* | 7/2013 | Sharifi | .................. | G10L 15/265 379/114.14 |
| 9,325,597 | B1* | 4/2016 | Clasen | ................ | H04L 43/0882 |
| 2002/0116197 | A1 | 8/2002 | Erten | | |
| 2004/0260554 | A1 | 12/2004 | Connell et al. | | |
| 2005/0075881 | A1* | 4/2005 | Rigazio | ............ | G06F 17/30796 704/270 |
| 2005/0125683 | A1* | 6/2005 | Matsuyama | ............ | G06F 21/33 713/189 |
| 2006/0200842 | A1* | 9/2006 | Chapman | ................ | H04N 7/163 725/34 |
| 2007/0273696 | A1* | 11/2007 | Cheng | ................ | G06K 9/00771 345/467 |
| 2008/0162115 | A1* | 7/2008 | Fuji | .................... | G06F 17/2827 704/7 |
| 2008/0288250 | A1* | 11/2008 | Rennillo | ............... | G06F 17/289 704/235 |
| 2010/0318360 | A1* | 12/2010 | Uehara | ............. | G06K 9/00335 704/260 |
| 2011/0066634 | A1* | 3/2011 | Phillips | .................. | G10L 15/22 707/769 |
| 2011/0149350 | A1* | 6/2011 | Matsuda | ............. | G06F 17/2241 358/462 |
| 2013/0035936 | A1* | 2/2013 | Garland | .................. | G10L 15/26 704/235 |
| 2014/0297266 | A1* | 10/2014 | Nielson | .................. | A61B 5/162 704/9 |
| 2015/0039306 | A1* | 2/2015 | Sidi | ......................... | G10L 15/01 704/235 |
| 2016/0132572 | A1* | 5/2016 | Chang | ............... | G06F 17/30569 707/723 |

OTHER PUBLICATIONS

"Dynamic language modeling for a daily broadcast news transcription system", C. Martins et.al. 2007, IEEE ASRU.
"Grounded Language Modeling for Automatic Speech Recognition of Sports Video", Michael Fleischman, Deb Roy ACL 2008.
"Late integration in audio-visual continuous speech recognition." Automatic Speech Recognition and Understanding., A. Verma et.al. 1999. IBM Technical Report.
"Learning Out-of-Vocabulary Words in Automatic Speech Recognition", Q. Long, Ph.D. Dissertation. Carnegie Mellon University, 2013.

* cited by examiner

METHOD AND SYSTEM FOR PROCESSING MULTIMEDIA CONTENT TO DYNAMICALLY GENERATE TEXT TRANSCRIPT

TECHNICAL FIELD

The presently disclosed embodiments are related, in general, to a speech recognition system. More particularly, the presently disclosed embodiments are related to a method and a system for processing multimedia content to dynamically generate a text transcript.

BACKGROUND

In the field of computer technology, past decade has witnessed massive advancements in various applications, such as automatic speech recognition (ASR) of multimedia content (e.g., video lecture). In a traditional environment, an ASR system may extract audio content of the multimedia content, and thereafter, generate a text transcript of the audio content along with estimates of corresponding time stamps.

In certain scenarios, the ASR system performance may deteriorate if the audio content is on a niche topic, for example, mathematical formulation of laws of gravity. Instructional videos usually fall in this category of niche topics. Such deterioration in the performance of the ASR system is largely due to lack of domain specific esoteric words. Further, there may not be adequate domain-specific data to train the ASR system. Another factor that deteriorates the performance of the ASR system, in case of the niche topics, is drift among topics in the multimedia content, hence, requiring a different ASR system that may be trained to cover such topics.

Further, the recognition results of the ASR system may contain a huge amount of phoneme-based errors due to misinterpretation of words, spoken in the multimedia content, by the ASR system. Such errors may degrade the quality of the transcript of the multimedia content, and furthermore, may confuse the user. Thus, there is a need for an improved, efficient and automated mechanism for obtaining error-free transcripts of the multimedia content.

Further limitations and disadvantages of conventional and traditional approaches will become apparent to a person having ordinary skill in the art, through a comparison of described systems with some aspects of the present disclosure, as set forth in the remainder of the present application and with reference to the drawings.

SUMMARY

According to embodiments illustrated herein, there may be provided a method of processing multimedia content to dynamically generate a text transcript. The method includes segmenting, by a region segmenting processor in an automatic speech recognition (ASR) unit in a computing device, each of a set of text frames that corresponds to visual content of the multimedia content, to determine one or more spatial regions comprising at least one or more portions of text content. The method further includes extracting, by a data processor in the ASR unit, one or more keywords from each of the determined one or more spatial regions. The method further includes determining, by a natural language processor in the ASR unit, a first set of keywords from the extracted one or more keywords based on filtering of at least one or more off-topic keywords from the extracted one or more keywords. The method further includes extracting, by the data processor, a second set of keywords from one or more knowledge databases based on at least the determined first set of keywords. The method further includes generating, by a graph generating processor in the ASR unit, a graph based on at least a semantic relationship between each of the first set of keywords and one or more of the second set of keywords. The method further includes, generating, by a speech-to-text generating processor in the ASR unit, dynamically the text transcript of audio content in the multimedia content based on at least the generated graph.

According to embodiments illustrated herein, there may be provided a system for processing multimedia content to dynamically generate a text transcript. The system includes a region segmenting processor in an automatic speech recognition (ASR) unit in a computing device that is configured to segment each of a set of text frames that corresponds to visual content of the multimedia content, to determine one or more spatial regions comprising at least one or more portions of text content. The system further includes a data processor in the ASR unit that is configured to extract one or more keywords from each of the determined one or more spatial regions. The system further includes a natural language processor in the ASR unit configured to determine a first set of keywords from the extracted one or more keywords based on filtering of at least one or more off-topic keywords from the one or more keywords. The data processor is further configured to extract a second set of keywords from one or more knowledge databases based on at least the determined first set of keywords. The method further includes a graph generating processor in the ASR unit that is configured to generate a graph based on at least a semantic relationship between each of the first set of keywords and one or more of the second set of keywords. The method further includes a speech-to-text generating processor in the ASR unit that is configured to generate dynamically the text transcript of audio content in the multimedia content based on at least the generated graph.

According to embodiments illustrated herein, there may be provided a computer program product for use with a computing device. The computer program product comprises a non-transitory computer readable medium storing a computer program code of processing multimedia content to dynamically generate a text transcript. The computer program code is executable by one or more processors to segment each of a set of text frames that corresponds to visual content of the multimedia content, to determine one or more spatial regions comprising at least one or more portions of text content. Further, the one or more processors are further configured to extract the one or more keywords from each of the determined one or more spatial regions. The computer program code is further executable by the one or more processors to determine a first set of keywords from the extracted one or more keywords based on filtering of at least one or more off-topic keywords from the one or more keywords. The computer program code is further executable by the one or more processors to extract a second set of keywords from one or more knowledge databases based on at least the determined first set of keywords. The computer program code is further executable by the one or more processors to generate a graph based on at least a semantic relationship between each of the first set of keywords and one or more of the second set of keywords. The computer program code is further executable by the one or more processors to generate dynamically the text transcript of audio content in the multimedia content based on at least the generated graph.

BRIEF DESCRIPTION OF DRAWINGS

The accompanying drawings illustrate the various embodiments of systems, methods, and other aspects of the disclosure. A person having ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
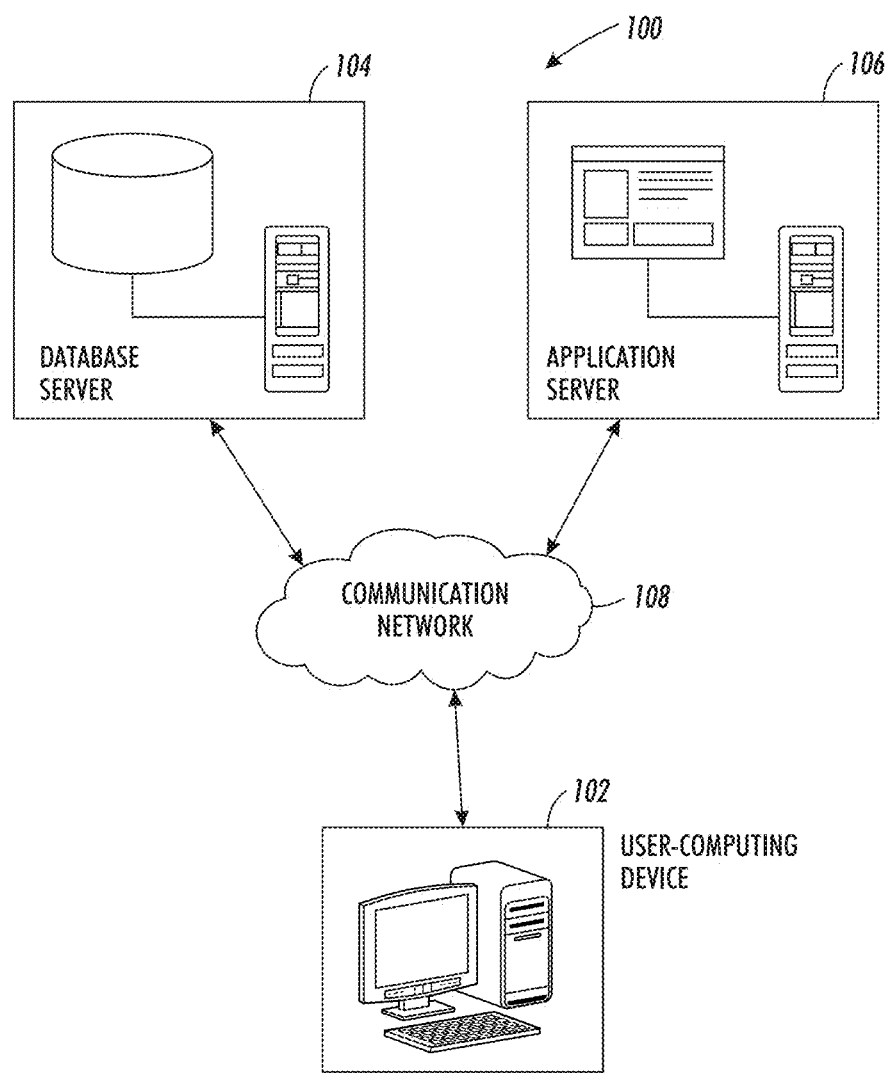
FIG. 1 is a block diagram that illustrates a system environment in which various embodiments can be implemented, in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the method and system may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

DEFINITIONS

The following terms shall have, for the purposes of this application, the respective meanings set forth below.

A "computing device" refers to a computer, a device (that includes one or more processors/microcontrollers and/or any other electronic components), or a system (that performs one or more operations according to one or more sets of programming instructions, codes, or algorithms) associated with an individual. In an embodiment, the individual may utilize the computing device to transmit a multimedia content (e.g., a video with at least audio content) to a computing server for processing. In another embodiment, the individual may utilize the computing device to broadcast the multimedia content in real-time on one or more other computing devices over one or more communication networks. Further, the individual may utilize the computing device to transmit his/her preferences for one or more of, but not limited to, the multimedia content, a location for displaying a text transcript of the multimedia content when the multimedia content is streaming on the computing device, and a language of the text transcript. Examples of the computing device may include, but are not limited to, a desktop computer, a laptop, a personal digital assistant (PDA), a mobile device, a smartphone, and a tablet computer (e.g., iPad® and Samsung Galaxy Tab®).

An "automatic speech recognition (ASR) unit" refers to a computing device that may be configured to convert audio content in multimedia content into text content. Firstly, the ASR unit may be configured to extract the audio content from the multimedia content, and thereafter, may convert the extracted audio content into the text content. In an embodiment, the ASR unit may comprise an acoustic unit, a dictionary unit, and a language unit. The acoustic unit may be configured to generate an acoustic signature of each of one or more phonemes that are associated with the audio content. The dictionary unit may comprise a repository of words that the ASR unit recognizes and provides a word-to-phoneme expansion of each word in the repository of words. Further, the language unit may be configured to determine a likelihood of a word being spoken in the audio content based on a set of preceding words that may have been spoken in the audio content.

"Multimedia content" refers to content that uses a combination of different content forms, such as text content, audio content, image content, animation content, video content, and/or interactive content. In an embodiment, the multimedia content may be reproduced on a computing device through an application, such as a media player (e.g., Windows Media Player®, Adobe® Flash Player, Apple® QuickTime®, and/or the like). In an embodiment, the multimedia content may be downloaded from a server to the user-computing device. In an alternate embodiment, the multimedia content may be retrieved from a media storage device, such as hard disk drive (HDD), CD drive, pen drive, and/or the like, connected to (or within) the computing device.

"Text transcript" refers to a written, typewritten, or printed version of content. For example, audio content in multimedia content (e.g., a video) is converted to obtain the text transcript of the audio content. Further, the text transcript may be displayed on a computing device in synchronization with the audio content.

A "frame" refers to an image that corresponds to a single picture or a still shot that is a part of multimedia content (e.g., a video). The multimedia content is usually composed of a plurality of frames that is rendered, on a display device, in succession to appear as a seamless piece of the multimedia content. In an embodiment, a text frame in the multimedia content may refer to the frame that includes at least one or more portions of text content. The text content may correspond to written text content, typed text content, and/or the like, or a combination thereof. In an embodiment, the text content may correspond to visual content of the multimedia content.

A "spatial region" refers to an area of interest in a frame of multimedia content. In an embodiment, the spatial region may comprise one or more portions of text content in the multimedia content. In an embodiment, one or more keywords may be extracted from the spatial region of the multimedia content based on at least an availability of the one or more portions of the text content in the spatial region.

A "first set of keywords" refers to a set of one or more keywords associated with one or more text frames of multimedia content. In an embodiment, the first set of keywords may be determined from one or more keywords, extracted from the one or more text frames, based on filtering of at least one or more off-topic keywords from the one or more keywords. The one or more off-topic keywords may correspond to one or more terms, phrases, or keywords that are not associated with an ongoing topic of discussion in the multimedia content. In an embodiment, the one or more off-topic keywords may be identified by clustering the distributional representation of the one or more keywords and identifying one or more outlier points. The one or more keyword that correspond to the one or more outlier points may correspond to the one or more off-topic keywords. For example, a word2vect model may be utilized to determine the proximity between the one or more keywords. Based on the determine proximity, the one or more off-topic keywords may be identified. The term "on-topic keywords" can be interchangeably used in the disclosure for the first set of keywords.

A "second set of keywords" refers to a set of one or more keywords that are associated with one or more of a first set of keywords. In an embodiment, there may exist a semantic relationship between the first set of keywords and one or more of the second set of keywords. In an embodiment, the second set of keywords may be extracted from one or more knowledge databases (e.g., Wikipedia® or WordNet®) based on the first set of keywords. In an embodiment, the knowledge databases may be an offline database or an online database.

A "graph" refers to a visual representation of one or more keywords that are associated with one or more text frames in multimedia content. In an embodiment, the graph may be generated based on a semantic relationship between a first set of keywords and one or more of a second set of keywords. In an embodiment, the graph may comprise one or more first nodes and one or more second nodes. Each node in the one or more first nodes corresponds to a keyword in the first set of keywords and each node in the one or more second nodes corresponds to a keyword in the second set of keywords. In an embodiment, the graph further comprises one or more edges. Each edge in the one or more edges is representative of the semantic relationship between each of the one or more first nodes and one or more of the one or more second nodes.

"One or more classifiers" refer to one or more statistical and/or mathematical models that may be configured to classify a set of social media data into one or more predefined categories. Such classification may be utilized to detect personal life events of one or more users. In an embodiment, prior to the classification, the one or more classifiers may be trained based on a set of features associated with a known set of social media data. Examples of the one or more classifiers may include, but are not limited to, a Logistic Regression, a Random Forest (RF) model, a Gaussian Naive Bayes (Gaussian NB), and/or a Bernauli Naive Bayes (Bernauli NB).

FIG. 1 is a block diagram of a system environment in which various embodiments of a method and a system for processing multimedia content to dynamically generate a text transcript may be implemented. With reference to FIG. 1, there is shown a system environment 100 that includes a user-computing device 102, a database server 104, an application server 106, and a communication network 108. Various devices in the system environment 100 may be interconnected over the communication network 108. FIG. 1 shows, for simplicity, one user-computing device, such as the user-computing device 102, one database server, such as the database server 104, and one application server, such as the application server 106. However, it will be apparent to a person having ordinary skill in the art that the disclosed embodiments may also be implemented using multiple user-computing devices, multiple database servers, and multiple application servers without departing from the scope of the disclosure.

The user-computing device 102 may refer to a computing device (associated with a user) that may be communicatively coupled to the communication network 108. The user may correspond to an individual, such as a student associated with an academic institute or an employee (e.g., a content analyst) associated with an organization, who may utilize the user-computing device 102 to transmit a request to the database server 104 or the application server 106 over the communication network 108. The request may correspond to the processing of the multimedia content to dynamically generate a text transcript of audio content in the multimedia content. Prior to the transmission of the request, in an embodiment, the user may utilize the user-computing device 102 to transmit the multimedia content to the database server 104 or the application server 106. In another embodiment, the user may utilize the user-computing device 102 to select the multimedia content from one or more data sources (e.g., YouTube®), and thereafter, may transmit the selected multimedia content to the database server 104 or the application server 106 over the communication network 108. In another embodiment, the user may utilize the user-computing device 102 to broadcast the multimedia content in real-time to one or more other users over the communication network 108.

The user-computing device 102 may include one or more processors in communication with one or more memory units. Further, in an embodiment, the one or more processors may be operable to execute one or more sets of computer-readable code, instructions, programs, or algorithms, stored in the one or more memory units, to perform one or more operations. In an embodiment, the user may utilize the user-computing device 102 to communicate with the database server 104 or the application server 106 over the communication network 108.

Further, in an embodiment, the user-computing device 102 may include one or more installed applications (e.g., Windows Media Player®, Adobe® Flash Player, Apple® QuickTime®, and/or the like) that may support the streaming of the multimedia content. In an embodiment, the user-computing device 102 may further include a display screen that may be configured to display one or more GUIs rendered by the application server 106 over the communication network 110. For example, the application server 106 may render a GUI displaying at least the streaming of the multimedia content along with the text transcript of the audio content in the multimedia content.

Examples of the user-computing device 102 may include, but are not limited to, a personal computer, a laptop, a PDA, a mobile device, a tablet, or any other computing device.

The database server 104 may refer to a computing device or a storage device that may be communicatively coupled to the communication network 108. In an embodiment, the database server 104 may be configured to perform one or more database operations. Examples of the one or more database operations may include receiving/transmitting one or more queries, requests, multimedia content, or input parameters from/to one or more computing devices, such as the user-computing device 102, or one or more computing servers, such as the application server 106. The one or more database operations may further include processing and storing the one or more queries, requests, multimedia content, or input parameters.

Further, in an embodiment, the database server 104 may be configured to store various metadata that are transmitted by the application server 106. For example, the database server 104 may store information associated with each text frame in a set of text frames identified form one or more frames in the multimedia content. Further, the database server 104 may store one or more keywords extracted from each of the set of text frames, a first set of keywords determined from the extracted one or more keywords, and a second set of keywords extracted from one or more knowledge databases. The database server 104 may be further configured to store the text transcript of the multimedia content.

Further, in an embodiment, the database server 104 may store one or more sets of instructions, code, scripts, or programs that may be retrieved by the application server 106 to perform one or more operations. For querying the database server 104, one or more querying languages, such as, but not limited to, SQL, QUEL, and DMX, may be utilized. In an embodiment, the database server 104 may be realized through various technologies, such as, but not limited to, Microsoft® SQL Server, Oracle®, IBM DB2®, Microsoft Access®, PostgreSQL®, MySQL®, and SQLite®.

A person having ordinary skill in the art will appreciate that the scope of the disclosure is not limited to realizing the database server 104 and the application server 106 as separate entities. In an embodiment, the one or more functionalities of the database server 104 may be integrated into the application server 106 or vice-versa, without departing from the scope of the disclosure.

The application server 106 refers to a computing device or a software framework hosting an application or a software service that may be communicatively coupled to the communication network 108. In an embodiment, the application server 106 may be implemented to execute procedures, such as, but not limited to, programs, routines, or scripts stored in one or more memory units for supporting the hosted application or the software service. In an embodiment, the hosted application or the software service may be configured to perform the one or more operations. In an embodiment, the one or more operations may include the processing of the multimedia content to dynamically generate the text transcript of the audio content in the multimedia content based on at least one or more portions of text content in the multimedia content. After generating the text transcript, the application server 106 may render the generated transcript of the multimedia content on a GUI displayed on the display screen of the user-computing device 102.

Prior to the rendering of the generated text transcript, in an embodiment, the application server 106 may receive the request and the multimedia content and the one or more input parameters associated with the request from the user-computing device 102 over the communication network 108. In another embodiment, the application server 106 may retrieve the multimedia content from the database server or the one or more data sources over the communication network 108, based on the at least the received request. Further, in an embodiment, the application server 106 may be configured to determine the one or more frames in the received (or retrieved) multimedia content. Further, the application server 106 may be configured to identify the set of text frames, that corresponds to visual content of the multimedia content, from the determined one or more frames. Further, the application server 106 may be configured to segment each of the set of text frames to determine one or more spatial regions in each of the identified set of text frames. Further, in an embodiment, the application server 106 may be configured to extract the one or more keywords from each of the determined one or more spatial regions. The extraction of the one or more keywords has been explained later in detail in conjunction with FIG. 3.

Further, in an embodiment, the application server 106 may be configured to determine the first set of keywords from the extracted one or more keywords based on filtering of at least one or more off-topic keywords from the extracted one or more keywords. The determination of the first set of keywords has been explained later in detail in conjunction with FIG. 3. Thereafter, the application server 106 may be further configured to extract the second set of keywords from the one or more knowledge databases based on the determined first set of keywords. The determination of the second set of keywords has been explained later in detail in conjunction with FIG. 3.

Further, in an embodiment, the application server 106 may be configured to generate a graph based on at least the semantic relationship between each of the first set of keywords and the one or more of the second set of keywords. The generation of the graph has been explained later in detail in conjunction with FIG. 3. In an embodiment, the application server 106 may be further configured to generate the text transcript of the audio content in the multimedia content based on at least the generated graph. In an embodiment, the application server 106 utilizes the generated graph to improve upon the quality and accuracy of the text transcript generated by the ASR unit in the application server 106.

Further, in an embodiment, the application server 106 may render the generated text transcript of the multimedia content on the GUI displayed on the display screen of user-computing device 102. In another embodiment, the application server 106 may be configured to embed the generated text transcript in the multimedia content along with the corresponding time stamps in the multimedia content.

The application server 106 may be realized through various types of application servers, such as, but not limited to, a Java application server, a .NET framework application server, a Base4 application server, a PHP framework application server, or any other application server framework. An embodiment of the structure of the application server 106 is described later in FIG. 2.

A person having ordinary skill in the art will appreciate that the scope of the disclosure is not limited to realizing the application server 106 and the user-computing device 102 as separate entities. In an embodiment, the application server 106 may be realized as an application program installed on and/or running on the user-computing device 102, without departing from the scope of the disclosure.

The communication network 108 may include a medium through which one or more devices, such as the user-computing device 102, and one or more servers, such as the database server 104 and the application server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
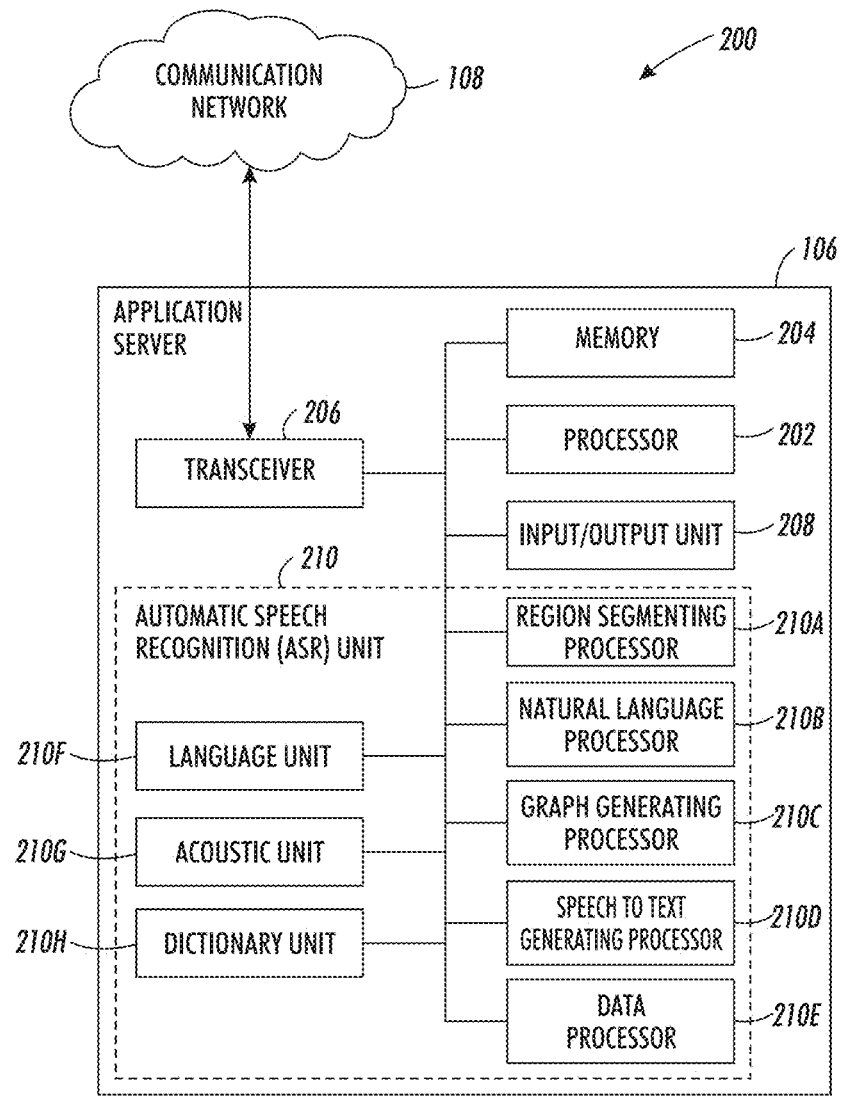
FIG. 2 is a block diagram that illustrates a system for processing multimedia content to generate a text transcript, in accordance with at least one embodiment.

FIG. 2 is a block diagram that illustrates a system for processing multimedia content to dynamically generate text transcript, in accordance with at least one embodiment. With reference to FIG. 2, there is shown a system 200 that may include one or more processors, such as a processor 202, one or more memory units, such as a memory 204, one or more transceivers, such as a transceiver 206, one or more input/output (I/O) units, such as an I/O unit 208, one or more ASR units, such as an ASR unit 210, one or more region segmenting processors, such as a region segmenting processor 210A, one or more natural language processors, such as a natural language processor 210B, one or more graph generating processors, such as a graph generating processor 210C, one or more speech-to-text generating processors, such as a speech-to-text generating processor 210D, one or more data processors, such as a data processor 210E, one or more language units, such as a language unit 210F, one or more acoustic units, such as an acoustic unit 210G, and one or more dictionary units, such as a dictionary unit 210H.

The system 200 may correspond to a computing device, such as, the user-computing device 102, or a computing server, such as, the application server 106, without departing from the scope of the disclosure. However, for the purpose of the ongoing description, the system 200 corresponds to the application server 106.

The processor 202 comprises suitable logic, circuitry, interfaces, and/or code that may be configured to execute the one or more sets of instructions, programs, or algorithms stored in the memory 204 to perform the one or more operations. For example, the processor 202 may be configured to update a pre-defined weight of each of the one or more first nodes and each of the one or more second nodes based on a weight of each of the one or more first nodes and each of the one or more second nodes, respectively. The processor 202 may determine the weight based on at least the semantic relationship and/or one or more constraints defined by the user. Further, the processor 202 may be configured to update one of the language unit 210F and the dictionary unit 210H in the ASR unit 210 based on at least the updated pre-defined weight of each of the one or more first nodes and each of the one or more second nodes in the generated graph. Further, in an embodiment, the processor 202 may be configured to associate the generated text transcript with the corresponding timestamps in the multimedia content. In an embodiment, the processor 202 may be communicatively coupled to the memory 204, the transceiver 206, the I/O unit 208, the region segmenting processor 210A, the natural language processor 210B, the graph generating processor 210C, the speech-to-text generating processor 210D, the data processor 210E, the language unit 210F, the acoustic unit 210G, and the dictionary unit 210H. The processor 202 may be further communicatively coupled to the communication network 108. The processor 202 may be implemented based on a number of processor technologies known in the art. The processor 202 may work in coordination with the memory 204, the transceiver 206, the I/O unit 208, the ASR unit 210, the region segmenting processor 210A, the natural language processor 210B, the graph generating processor 210C, the speech-to-text generating processor 210D, the data processor 210E, the language unit 210F, the acoustic unit 210G, and the dictionary unit 210H for processing multimedia content to dynamically generate a text transcript. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may be operable to store one or more machine code and/or computer programs having at least one code section executable by the processor 202, the transceiver 206, the I/O unit 208, the region segmenting processor 210A, the natural language processor 210B, the graph generating processor 210C, the speech-to-text generating processor 210D, the data processor 210E, the language unit 210F, the acoustic unit 210G, and the dictionary unit 210H. The memory 204 may store the one or more sets of instructions, programs, code, or algorithms that are executed by the processor 202, the transceiver 206, the I/O unit 208, the region segmenting processor 210A, the natural language processor 210B, the graph generating processor 210C, the speech-to-text generating processor 210D, the data processor 210E, the language unit 210F, the acoustic unit 210G, and the dictionary unit 210H. In an embodiment, the memory 204 may include one or more buffers (not shown). In an embodiment, the one or more buffers may be configured to store the extracted one or more keywords, the determined first set of keywords, the determined second set of keywords, and the generated text transcript. Some of the commonly known memory implementations may include, but are not limited to, a random access memory (RAM), a read only memory (ROM), a hard disk drive (HDD), and a secure digital (SD) card. It will be apparent to a person having ordinary skill in the art that the one or more instructions stored in the memory 204 enables the hardware of the system 200 to perform the one or more operations.

The transceiver 206 comprises suitable logic, circuitry, interfaces, and/or code that may be configured to receive/transmit the one or more queries, request, multimedia content, input parameters, or other information from/to one or more computing devices or servers (e.g., the user-computing device 102, the database server 104, or the application server 106) over the communication network 108. The transceiver 206 may implement one or more known technologies to support wired or wireless communication with the communication network 108. The transceiver 206 may implement one or more known technologies to support wired or wireless communication with the communication network 108. In an embodiment, the transceiver 206 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O unit 208 comprises suitable logic, circuitry, interfaces, and/or code that may be operable to facilitate the individual, such as the user, to provide one or more input parameters. For example, the user may utilize the I/O unit 208 to provide one or more constraints that are required to determine the weight of each of the one or more first nodes and each of the one or more second nodes. The I/O unit 208 may be operable to communicate with the processor 202, the memory 204, the transceiver 206, the region segmenting processor 210A, the natural language processor 210B, the graph generating processor 210C, the speech-to-text generating processor 210D, the data processor 210E, the language unit 210F, the acoustic unit 210G, and the dictionary unit 210H. Further, in an embodiment, the I/O unit 208, in conjunction with the processor 202 and the transceiver 206, may be operable to provide one or more responses (e.g., the dynamically generated text transcript of the multimedia content) in response to the received request. Examples of the input devices include, but are not limited to, a keyboard, a mouse, a joystick, a touch screen, a microphone, a camera, and/or a docking station. Examples of the output devices include, but are not limited to, a display screen and/or a speaker.

The ASR unit 210 comprises suitable logic, circuitry, interfaces, and/or code that may be configured to execute the one or more sets of instructions, programs, or algorithms stored in the memory 204 to perform the one or more operations. For example, in an embodiment, the ASR unit 210 may be configured to dynamically generate the text transcript based on the processing of the audio content and the text content in the one or more frames of the multimedia content. The ASR unit 210 may be communicatively coupled to the processor 202, the memory 204, the transceiver 206, and the I/O unit 208. In an embodiment, the ASR unit 210 may further comprise one or more processing units, such as, the region segmenting processor 210A, the natural language processor 210B, the graph generating processor 210C, the speech-to-text generating processor 210D, the data processor 210E, the language unit 210F, the acoustic unit 210G, and the dictionary unit 210H. The ASR unit 210 may be implemented based on a number of processor technologies known in the art. For example, the ASR unit 210 may be implemented using one or more of, but not limited to, an X86-based processor, a RISC processor, an ASIC processor, a CISC processor, and/or other such processor.

The region segmenting processor 210A comprises suitable logic, circuitry, interfaces, and/or code that may be configured to execute the one or more sets of instructions, programs, or algorithms stored in the memory 204 to perform the one or more operations. For example, the region segmenting processor 210A may be configured to segment each of the set of text frames that corresponds to the visual content of the multimedia content to determine the one or more spatial regions. The one or more spatial regions comprises at least the one or more portions of the text content. The region segmenting processor 210A may be communicatively coupled to the processor 202, the memory 204, the transceiver 206, the I/O unit 208, the natural language processor 210B, the graph generating processor 210C, the speech-to-text generating processor 210D, the data processor 210E, the language unit 210F, the acoustic unit 210G, and the dictionary unit 210H. The region segmenting processor 210A may be implemented based on a number of processor technologies known in the art. For example, the region segmenting processor 210A may be implemented using one or more of, but not limited to, an X86-based processor, a RISC processor, an ASIC processor, a CISC processor, and/or other such processor.

The natural language processor 210B comprises suitable logic, circuitry, interfaces, and/or code that may be configured to execute the one or more sets of instructions, programs, or algorithms stored in the memory 204 to perform the one or more operations. For example, the natural language processor 210B may be configured to determine the first set of keywords from the one or more keywords extracted from each of the set of text frames identified in the multimedia content. The first set of keywords may be determined based on the filtering of the one or more off-topic keywords from the extracted one or more keywords. The natural language processor 210B may be communicatively coupled to the processor 202, the memory 204, the transceiver 206, the I/O unit 208, the region segmenting processor 210A, the graph generating processor 210C, the speech-to-text generating processor 210D, the data processor 210E, the language unit 210F, the acoustic unit 210G, and the dictionary unit 210H. The natural language processor 210B may be implemented based on a number of processor technologies known in the art. For example, the natural language processor 210B may be implemented using one or more of, but not limited to, an X86-based processor, a RISC processor, an ASIC processor, a CISC processor, and/or other such processor.

The graph generating processor 210C comprises suitable logic, circuitry, interfaces, and/or code that may be configured to execute the one or more sets of instructions, programs, or algorithms stored in the memory 204 to perform the one or more operations. For example, the graph generating processor 210C may be configured to generate the graph based on the semantic relationship between each of the first set of keywords and the one or more second set of keywords. The graph generating processor 210C may be communicatively coupled to the processor 202, the memory 204, the transceiver 206, the I/O unit 208, the region segmenting processor 210A, the natural language processor 210B, the speech-to-text generating processor 210D, the data processor 210E, the language unit 210F, the acoustic unit 210G, and the dictionary unit 210H. The graph generating processor 210C may be implemented based on a number of processor technologies known in the art. For example, the graph generating processor 210C may be implemented using one or more of, but not limited to, an X86-based processor, a RISC processor, an ASIC processor, a CISC processor, and/or other such processor.

The speech-to-text generating processor 210D comprises suitable logic, circuitry, interfaces, and/or code that may be configured to execute the one or more sets of instructions, programs, or algorithms stored in the memory 204 to perform the one or more operations. For example, the speech-to-text generating processor 210D may be configured to generate the text transcript of the audio content in the multimedia content by use of the language unit 210F, the acoustic unit 210G, and the dictionary unit 210H. The speech-to-text generating processor 210D may be communicatively coupled to the processor 202, the memory 204, the transceiver 206, the I/O unit 208, the region segmenting processor 210A, the natural language processor 210B, graph generating processor 210C, the data processor 210E, the language unit 210F, the acoustic unit 210G, and the dictionary unit 210H. The speech-to-text generating processor 210D may be implemented based on a number of processor technologies known in the art. For example, the speech-to-text generating processor 210D, may be implemented using one or more of, but not limited to, an X86-based processor, a RISC processor, an ASIC processor, a CISC processor, and/or other such processor.

The data processor 210E comprises suitable logic, circuitry, interfaces, and/or code that may be configured to execute the one or more sets of instructions, programs, or algorithms stored in the memory 204 to perform the one or more operations. For example, the data processor 210E may be configured to extract the one or more keywords from each of the determined one or more spatial regions. In an embodiment, the data processor 210E may be further configured to extract the second set of keywords from the one or more knowledge databases based on the one or more keywords in the first set of keywords. The data processor 210E may be communicatively coupled to the processor 202, the memory 204, the transceiver 206, the I/O unit 208, the region segmenting processor 210A, the natural language processor 210B, graph generating processor 210C, the speech-to-text generating processor 210D, the language unit 210F, the acoustic unit 210G, and the dictionary unit 210H. The data processor 210E, may be implemented based on a number of processor technologies known in the art. For example, the data processor 210E, may be implemented using one or more of, but not limited to, an X86-based processor, a RISC processor, an ASIC processor, a CISC processor, and/or other such processor.

The language unit 210F comprises suitable logic, circuitry, interfaces, and/or code that may be configured to execute the one or more sets of instructions, programs, or algorithms stored in the memory 204 to perform the one or more operations. In an embodiment, the language unit 210F may be further realized based on a mathematical and statistical model that may be configured to determine the likelihood of a word being spoken based on a set of preceding words. The language unit 210F, may be implemented using one or more of, but not limited to, an X86-based processor, a RISC processor, an ASIC processor, a CISC processor, and/or other such processor. Further, the language unit 210F may be implemented using one or more classifiers. Examples of the one or more classifiers may include, but are not limited to, a Logistic Regression, a Random Forest (RF) model, a Gaussian Naive Bayes (Gaussian NB), and/or a Bernauli Naive Bayes (Bernauli NB).

The acoustic unit 210G comprises suitable logic, circuitry, interfaces, and/or code that may be configured to execute the one or more sets of instructions, programs, or algorithms stored in the memory 204 to perform the one or more operations. In an embodiment, the language unit 210F may be further realized based on a mathematical and statistical model that may be configured to generate the acoustic signature of each of the one or more phonemes that may be associated with the audio content. The acoustic unit 210G may be implemented using one or more of, but not limited to, an X86-based processor, a RISC processor, an ASIC processor, a CISC processor, and/or other such processor. Further, the language unit 210F may be implemented using one or more classifiers. Examples of the one or more classifiers may include, but are not limited to, a Logistic Regression, a RF model, a Gaussian NB, and/or a Bernauli NB.

The dictionary unit 210H comprises suitable logic, circuitry, interfaces, and/or code that may be configured to execute the one or more sets of instructions, programs, or algorithms stored in the memory 204 to perform the one or more operations. In an embodiment, the language unit 210F may be further realized based on a mathematical and statistical model. For example, the dictionary unit 210H may comprise the repository of words that the ASR unit 210 recognizes and provides the word-to-phoneme expansion of each word in the repository of words. The dictionary unit 210H may be implemented using one or more of, but not limited to, an X86-based processor, a RISC processor, an ASIC processor, a CISC processor, and/or other such processor. Further, the language unit 210F may be implemented using one or more classifiers. Examples of the one or more classifiers may include, but are not limited to, a Logistic Regression, a RF model, a Gaussian NB, and/or a Bernauli NB.

Figure 3:
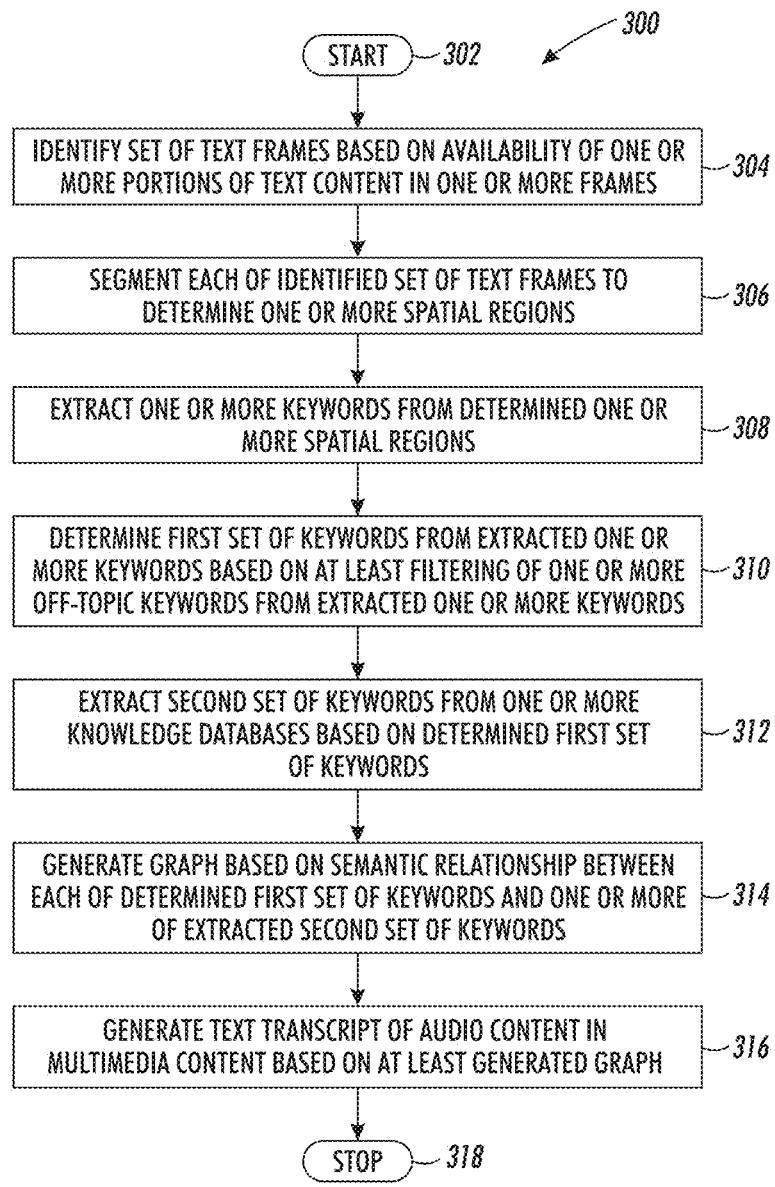
FIG. 3 is a flowchart that illustrates a method for processing multimedia content to generate a text transcript, in accordance with at least one embodiment.

FIG. 3 is a flowchart that illustrates a method for processing multimedia content to generate text transcript, in accordance with at least one embodiment. With reference to FIG. 3, there is shown a flowchart 300 that is described in conjunction with FIG. 1 and FIG. 2. The method starts at step 302 and proceeds to step 304.

At step 304, the set of text frames is identified based on the availability of the one or more portions of the text content in the one or more frames in the multimedia content. In an embodiment, the processor 202 may be configured to identify the set of text frames from the one or more frames in the multimedia content based on the availability of the one or more portions of the text content in the one or more frames. In an embodiment, the one or more portions of the text content may comprise at least one or more typed keywords and/or one or more handwritten keywords.

Prior to the identification of the set of text frames, the processor 202 may be configured to determine the one or more frames of the multimedia content. Thereafter, the processor 202 may utilize a trained classifier to identify each of the set of text frames, that corresponds to the visual content of the multimedia content, from the determined one or more frames. In an embodiment, each of the set of text frames is identified from the determined one or more frames based on the availability of the one or more portions of the text content (e.g., one or more typed keywords and/or one or more handwritten keywords) in the determined one or more frames. For example, the processor 202 may utilize a trained binary-class linear SVM classifier which may utilize Histogram of Oriented Gradients (HOG) feature computed on each of the one or more frames to classify each of the one or more frames into one of a text-frame category or a non-text-frame category. The one or more frames containing the text content (i.e., typed or written text) are classified in the text-frame category. The one or more frames that do not contain the text content are classified in the non-text-frame category. The one or more frames that are classified into the text-frame category are identified as the set of text frames. After identifying the set of text frames, the processor 202, in conjunction with the transceiver 206, may store the identified set of text frames of the multimedia content in the storage device, such as the memory 204 or the database server 104.

At step 306, each of the identified set of text frames are segmented to determine the one or more spatial regions. In an embodiment, the region segmenting processor 210A may be configured to segment each of the identified set of text frames to determine the one or more spatial regions. In an embodiment, the one or more spatial regions may comprise at least the one or more portions of the text content. The region segmenting processor 210A may segment each of the set of text frames by use of one or more segmentation techniques known in the art. For example, the region segmenting processor 210A utilizes a mean shift segmentation (MSS) technique to segment each text frame in the identified set of text frames into the one or more spatial regions. The MSS technique is a non-parametric clustering based segmentation technique that identifies text content in the visual content of the identified set of text frames. After determining the one or more spatial regions, the processor 202, in conjunction with the transceiver 206, may store the determined one or more spatial regions of each of the identified set of text frames in the storage device, such as the memory 204 or the database server 104.

At step 308, the one or more keywords are extracted from the determined one or more spatial regions. In an embodiment, the data processor 210E may be configured to extract the one or more keywords from the determined one or more spatial regions. In an embodiment, the data processor 210E may extract the one or more keywords from the determined one or more spatial regions based on the availability of the one or more portions of the text content in each of the determined one or more spatial regions. The one or more portions of the text content may comprise the one or more typed keywords and/or the one or more handwritten keywords. In an exemplary scenario, the data processor 210E may extract the one or more typed keywords by use of one or more optical character recognition (OCR) engines known in the art, such as, a Tesseract OCR engine. In another exemplary scenario, the data processor 210E may extract the one or more handwritten keywords by use of one or more techniques known in the art, for example, a recurrent neural network (RNN) based technique. After extracting the one or more keywords, the processor 202, in conjunction with the transceiver 206, may store the extracted one or more keywords pertaining to each of the identified text frames in the storage device, such as the memory 204 or the database server 104. The extraction of the one or more keywords from a text frame that corresponds to the visual content of the multimedia content has been described later with an illustrative example in conjunction with FIG. 5.

At step 310, the first set of keywords is determined from the extracted one or more keywords based on the filtering of the one or more off-topic keywords from the extracted one or more keywords. In an embodiment, the natural language processor 210B may be configured to determine the first set of keywords from the extracted one or more keywords based on the filtering of the one or more off-topic keywords from the extracted one or more keywords.

Prior to the determination of the first set of keywords, the natural language processor 210B may be configured to identify the one or more off-topic keywords. The detection of the one or more off-topic keywords from the extracted one or more keywords is based on an assumption that the one or more off-topic keywords are outliers in comparison with one or more on-topic keywords. In such a scenario, the one or more off-topic keywords may be identified by clustering a distributional representation of the one or more keywords in each of the identified set of text frames. The one or more off-topic keywords may comprise one or more of, but not limited to, a repeated keyword in a text frame, numerals or keywords with one or more special characters and/or the like. After identifying the one or more off-topic keywords, the natural language processor 210B may filter out the one or more off-topic keywords from the extracted one or more keywords to determine the first set of keywords. Further, the natural language processor 210B, in conjunction with the transceiver 206, may store the determined first set of keywords in the storage device, such as the memory 204 or the database server 104. The determination of the first set of keywords from the extracted one or more keywords has been described later with an illustrative example in conjunction with FIG. 5.

At step 312, the second set of keywords is extracted from the one or more knowledge databases based on the determined first set of keywords. In an embodiment, the data processor 210E may be configured to extract the second set of keywords from the one or more knowledge databases based on the determined first set of keywords. In an embodiment, the data processor 210E may generate a query based on the determined first set of keywords. Thereafter, the data processor 210E may transmit the generated query to the one or more knowledge databases (e.g., Wikipedia® or WordNet®) to extract the second set of keywords. The one or more keywords in the extracted second set of keywords may be related, for example, semantically related, with the one or more keywords in the first set of keywords. In an embodiment, the second set of keywords may be extracted from an offline knowledge database. In an alternate embodiment, the second set of keywords may be extracted from an online knowledge database. The extraction of the second set of keywords has been described later with an illustrative example in conjunction with FIG. 5.

At step 314, the graph is generated based on the semantic relationship between each of the determined first set of keywords and the one or more of the extracted second set of keywords. In an embodiment, the graph generating processor 210C may be configured to generate the graph based on the semantic relationship between each of the determined first set of keywords and the one or more of the extracted second set of keywords. In an embodiment, the graph may comprise the one or more first nodes and the one or more second nodes. Further, each node in the one or more first nodes corresponds to the keyword in the first set of keywords and each node in the one or more second nodes corresponds to the keyword in the second set of keywords. Further, the count of the one or more first nodes is based on the count of keywords in the first set of keywords and the count of the one or more second nodes is based on the count of keywords in the second set of keywords. Further, in an embodiment, the graph may comprise the one or more edges. The edge in the one or more edges corresponds to the semantic relationship between a first node in the one or more first nodes and a second node in the one or more second nodes. Further, in an embodiment, each of the one or more first nodes and second nodes that corresponds to a keyword in the generated graph is associated with a pre-defined weight that corresponds to a probability of occurrence of the keyword.

Figure 6:
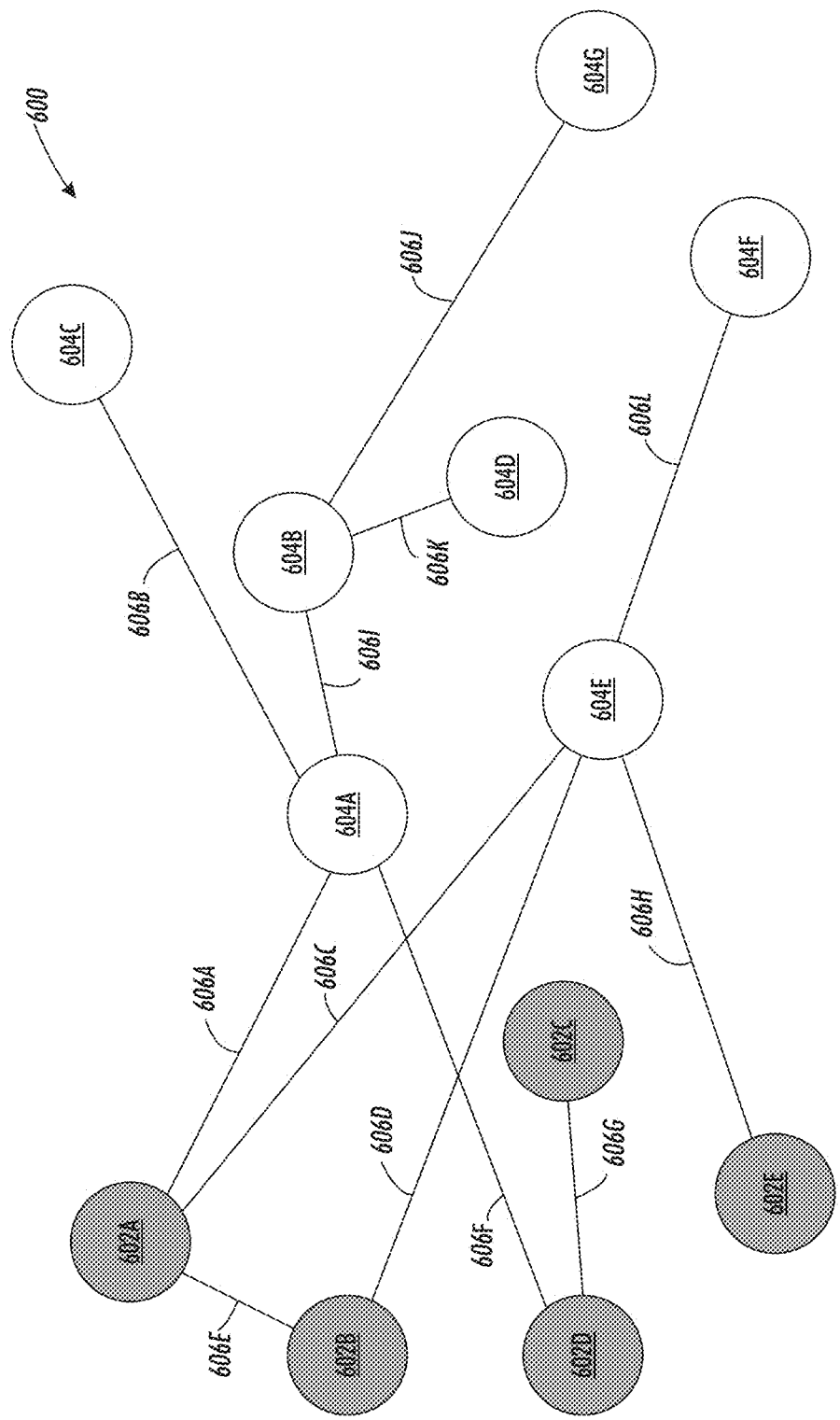
FIG. 6 is a graphical representation that illustrates an exemplary graph comprising a first set of keywords and a second set of keywords, in accordance with at least one embodiment.

Further, in an embodiment, the processor 202 may be configured to update the pre-defined weight of each of the one or more first nodes and second nodes based on the weight determined for each of the one or more first nodes and second nodes. The processor 202 may determine the weight for each node in the generated graph based on a solution of an optimization problem (denoted by equation-1), based on the semantic relationship between two nodes and the one or more constraints defined by the user (denoted by equation-2, equation-3, equation-4, and equation-5).

$$\min \sum_{(i,j) \in E} |a_i - a_j| \quad (1)$$

$$a_i \geq a_j, \forall\, i = 1, \ldots, |L|, \forall\, j = 1, \ldots, |D| \quad (2)$$

$$a_k \geq 0, \forall\, k = 1, \ldots, M \quad (3)$$

$$\sum_{k=1}^{|M|} a_k \leq 1 \quad (4)$$

$$\sum_{i \in M}(p_i + a_i) + \sum_{j \in J} p_j - \frac{\sum_{k=1}^{|M|} a_k}{|J|} = 1 \quad (5)$$

where, $p_j$: corresponds to a unigram probability for keyword $j \in V$, where "V" denotes a language model vocabulary and $|V|$ denotes vocabulary size;

$L \subseteq V$: corresponds to a first set of keywords in "V" that are recognized from visual content in multimedia content;

$D \subseteq V$: corresponds to a second set of keywords in "V" that are obtained after expanding keywords in "L";

E: corresponds to an extended-keyword graph as shown in FIG. 6. In FIG. 6, Keywords in "L" and "D" correspond to nodes and an edge between a node in "L" and a node in "D" indicates a relationship (e.g., schematic, co-occurrence, and/or the like) between the node in "L" and the node in "D";

$a_i$: corresponds to a weight by which the unigram probability estimate for keyword "i" is incremented. "$a_i$" is defined only for keywords in the set M=L∪D. For other keywords in "V" (i.e., J=V−M), the left over probability mass is uniformly distributed; and $|L|, |M|, |J|, |$ and $D|$: correspond to size of these sets, respectively.

In an embodiment, the processor 202 may be configured to determine an optimal solution of the above equation (denoted by equation-1) subject to the one or more constraints (denoted by equation-2, equation-3, equation-4, and equation-5) to determine the weight of each of the one or more first nodes and second nodes. The one or more constraints (denoted by equation-2, equation-3, equation-4, and equation-5), as defined by the user, may further be utilized by the processor 202 to determine the optimal solution. The one or more constraints, such as a constraint (denoted by equation-2), may indicate that an increment for each of the first set of keywords may be higher than each of the second set of keywords. The one or more constraints, such as a constraint (denoted by equation-3), may indicate that the increment may be positive. The one or more constraints, such as a constraint (denoted by equation-4), may indicate that the total increment may be bounded by 1. The one or more constraints, such as a constraint (denoted by equation-5), may indicate that the keywords in "D" that may be semantically close to the keywords in "L" may be given similar increments.

After determining the weight, the processor 202 may be further configured to update the pre-defined weight of each of the one or more first nodes and each of the one or more second nodes based on the determined weight of each of the one or more first nodes and each of the one or more second nodes, respectively. Further, the processor 202 may be configured to update at least one of the language unit 210F and the dictionary unit 210H based on at least the updated pre-defined weight of each of the one or more first nodes and each of the one or more second nodes in the generated graph. The updating of the language unit 210F may correspond to the updating of the probability of occurrence of a keyword being spoken. The updating of the dictionary unit 210H may correspond to the updating of the one or more keywords in the dictionary unit 210H.

At step 316, the text transcript of the audio content in the multimedia content is generated based on the generated graph. In an embodiment, the speech-to-text generating processor 210D may be configured to generate the text transcript of the audio content in the multimedia content based on the generated graph. In an embodiment, the speech-to-text generating processor 210D may utilize at least one of the updated language unit 210F and the updated dictionary unit 210H to generate the text transcript of the audio content in the multimedia content.

Generally, the speech-to-text generating processor 210D is configured to generate the text transcript of the audio content in multimedia content by use of the language unit 210F, acoustic unit 210G, and the dictionary unit 210H. In an embodiment, the speech-to-text generating processor 210D may utilize at least one of the updated language unit 210F and the updated dictionary unit 210H to enhance upon the accuracy of the generated text transcript. The control passes to end step 318.

Figure 4:
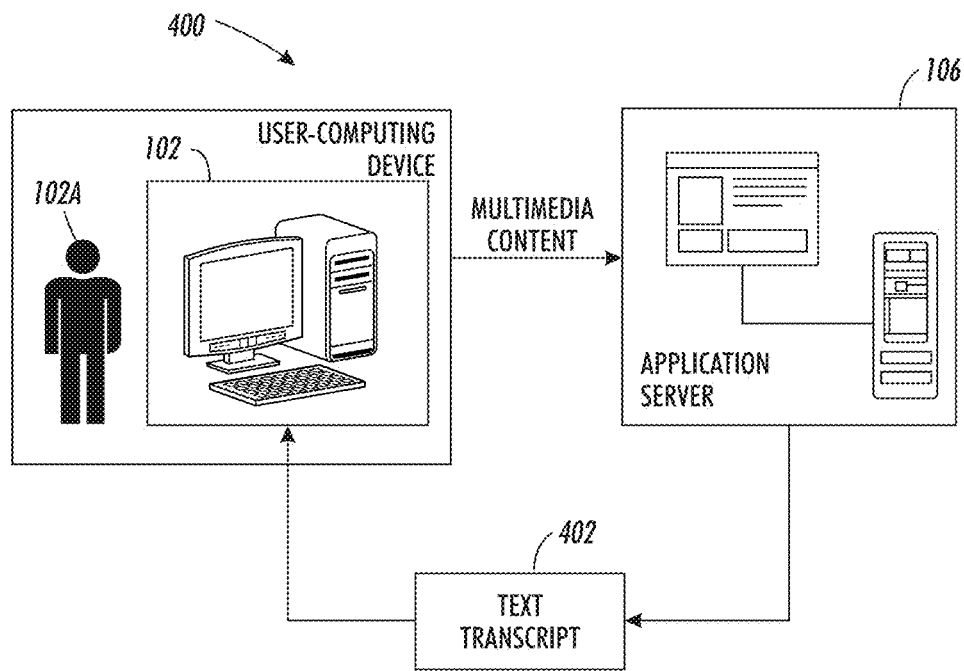
FIG. 4 is a block diagram that illustrates an exemplary workflow for processing multimedia content to dynamically generate a text transcript, in accordance with at least one embodiment.

FIG. 4 is a block diagram that illustrates an exemplary workflow for processing the multimedia content to dynamically generate the text transcript, in accordance with at least one embodiment. With reference to FIG. 4, there is shown an exemplary workflow 400 that has been described in conjunction with FIG. 1, FIG. 2, and FIG. 3.

In an embodiment, the user 102A associated with the user-computing device 102 may transmit the request for generating the text transcript of the multimedia content. Further, the one or more processors in the application server 106 may be configured to process the multimedia content to obtain the first set of keywords and the second set of keywords. The first set of keywords corresponds to the one or more on-topic keywords in the set of text frames that are associated with the visual content of the multimedia content. The second set of keywords corresponds to the one or more keywords that are extracted from the one or more knowledge databases based on the first set of keywords. Further, the graph is generated based on the first set of keywords and the second set of keywords. The one or more first nodes in the generated graph correspond to the one or more keywords in the first set of keywords. Similarly, the one or more second nodes in the generated graph correspond to the one or more keywords in the second set of keywords. Each of the one or more first nodes and second nodes is associated with the pre-defined weight that is updated based on the weight determined for each of the one or more first nodes and second nodes. The weight is determined based on the relationship (e.g., semantic and co-occurrence) between the one or more first nodes and the one or more second nodes.

After updating the pre-defined weight of the one or more first nodes and the one or more second nodes, the language unit 210F and/or the dictionary unit 210H may be updated based on the updated pre-defined weight. Such update in the pre-defined weight of the one or more keywords in the language unit 210F and/or the dictionary unit 210H may further be utilized to replace the one or more keywords in generated text transcript (denoted by 402) that may have been misinterpreted by the speech-to-text generating processor 210D.

In an alternate embodiment, the processor 202 may generate a phone-level confusion matrix based on the knowledge of acoustic-phonetics data from the dictionary unit 210H. For example, the processor 202 may determine the phone level pronunciation for Toyota is "t oo y oo t aa." Now, the ASR unit 210 recognizes the word as "toy at a." The phone (acoustic) level pronunciation for this phrase may be: "t aw y ae t a." Further, the processor 202 may generate the phone-level confusion matrix based on the knowledge of acoustic-phonetics data from the dictionary unit. The phone-level confusion matrix may comprise a penalty associated with the phonemes for misrecognizing a phone with another phone. The values in the matrix may be {0, 1, 2} indicating {"no misrecognition," "minor misrecognition," "major misrecognition"}, respectively. For example entries in the matrix are: M(aa, aa)=0; M(aa, ae)=1; M(aa, t)=2. Further, these determined values may be used by the processor 202 to extract the second set of keywords and generate the graph.

In an exemplary embodiment, the processor 202, for each pair of visual and spoken keywords, may compute a term-level confusion score. Further, the processor 202 may update the score of the keywords by "1." Further, if the term-level confusion is above a threshold (defined by the user), then the spoken term is replaced by the visual term in the transcript of the multimedia content.

Figure 5:
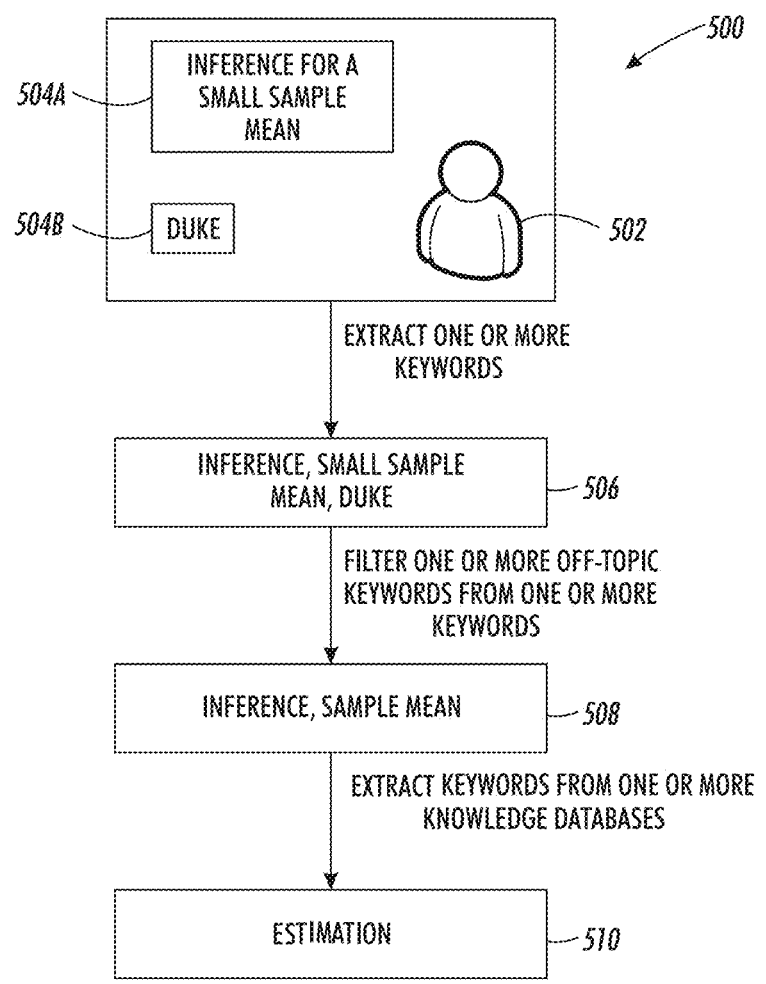
FIG. 5 is a block diagram that illustrates an exemplary scenario for processing text content in visual content of multimedia content, in accordance with at least one embodiment.

FIG. 5 is a block diagram that illustrates an exemplary scenario for processing text content in visual content of multimedia content, in accordance with at least one embodiment. With reference to FIG. 5, there is shown a block diagram 500 that includes a GUI (denoted by 502). The GUI (denoted by 502) corresponds to the visual content in the multimedia content. The GUI (denoted by 502) includes two spatial regions (denoted by 504A and 504B) comprising the text content. For example, the spatial region 504A comprises the text content "inference for a small sample mean." The spatial region 504B comprises the text content "duke." In an embodiment, the data processor 210E may be configured to extract the one or more keywords (denoted by 506) from the text content associated with the two spatial regions (denoted by 504A and 504B) in the GUI (denoted by 502). For example, the extracted one or more keywords (denoted by 506) include "inference," "small," "sample," "mean," and "duke." Thereafter, the natural language processor 210B may be configured to determine the first set of keywords (denoted by 508) based on the filtering of the one or more off-topic keywords from the one or more keywords (denoted by 506). For example, the first set of keywords (denoted by 508) includes "inference," "sample," and "mean." Further, in an embodiment, the data processor 210E may be configured to extract the second set of keywords (denoted by 510) from the one or more knowledge databases (Wikipedia® or WordNet®) based on the first set of keywords (denoted by 508). For example, the second set of keywords (denoted by 510) includes "estimation." The one or more keywords in the first set of keywords (denoted by 508) and the one or more keywords in the second set of keywords (denoted by 510) may be semantically related to each other.

FIG. 6 is a graphical representation that illustrates an exemplary graph comprising a first set of keywords and a second set of keywords, in accordance with at least one embodiment. With reference to FIG. 6, there is shown a graph 600 that includes one or more first nodes (denoted by 602A, 602B, 602C, 602D, and 602E) and one or more second nodes (denoted by 604A, 604B, 604C, 604D, 604E, 604F, and 604G). In an embodiment, the one or more first nodes (denoted by 602A, 602B, 602C, 602D, and 602E) may correspond to the one or more keywords in the first set of keywords (denoted by 508 in FIG. 5) that have been detected from the GUI (denoted by 502 in FIG. 5). The GUI (denoted by 502 in FIG. 5) may correspond to the visual content comprising the text content in the multimedia content. In an embodiment, the one or more second nodes (denoted by 604A, 604B, 604C, 604D, 604E, 604F, and 604G) may correspond to the one or more keywords in the second set of keywords (denoted by 510 in FIG. 5) that have been extracted from the one or more knowledge databases.

With reference to FIG. 6, there is further shown one or more edges (denoted by 606A, 606B, 606C, 606D, 606E, 606F, 606G, 606H, 606I, 606J, 606K, and 606L). In an embodiment, each of the one or more edges (denoted by 606A, 606B, 606C, 606D, 606E, 606F, 606G, 606H, 606I, 606J, 606K, and 606L) between a first node from the one or more first nodes (denoted by 602A, 602B, 602C, 602D, and 602E) and a second node from the one or more second nodes (denoted by 604A, 604B, 604C, 604D, 604E, 604F, and 604G) may represent the relationship (e.g., semantic or co-occurrence) between the first node and the second node.

The disclosed embodiments encompass numerous advantages. The disclosure provides a method and a system for processing multimedia content to dynamically generate a text transcript of audio content in the multimedia content. The text transcript is generated based on one or more keywords in one or more text frames that correspond to visual content in the multimedia content. The utilization of the one or more keywords in the generation of the text transcript may reduce the chances of misinterpretation in the generation of the text transcript. Hence, the disclosed method provides a much more efficient, enhanced, and accurate text transcript of the multimedia content by use of text content in the visual content of the multimedia content. Other benefits of the disclosed method and system includes improved efficiency and accuracy of the generated text transcript of the multimedia content (e.g., educational videos), which can be further utilized in several applications, such as retrieving relevant multimedia content when searching, better table of content generation, and so on.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive, such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks, such as LAN, MAN, WAN, and the internet. The computer system facilitates input from a user through input devices accessible to the system through the I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The system and method described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above method and system, or the numerous possible variations thereof.

Various embodiments of the method and system for processing multimedia content to dynamically generate a text transcript have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for dynamically generating a text transcript, comprising:

segmenting, by an application server comprising a processor, each identified set of text frames to determine one or more spatial regions, wherein the one or more spatial regions comprise at least one or more portions of text content;

extracting, by an application server comprising a processor, one or more keywords from the one or more spatial regions, wherein the one or more keywords are extracted from one or more available portions of the text content in the one or more spatial regions;

determining, by an application server comprising a processor, a first set of keywords from the one or more extracted keywords by filtering one or more off-topic keywords from the one or more extracted keywords;

extracting, by an application server comprising a processor, a second set of keywords similar to or related with the one or more second set of keywords, wherein the second set of keywords being retrieved from one or more knowledge databases;

generating, by an application server comprising a processor, a graph from a semantic relationship between the first set of keywords and the second set of keywords, wherein the graph comprises one or more first nodes and one or more second nodes with each node in the one or more first nodes corresponding with a keyword in the first set of keywords and each node in the one or more second nodes corresponding with a keyword in the second set of keywords; and generating, by an application server comprising a processor, the text transcript of the audio content in the multimedia content using the generated graph, wherein the generating of the text transcript comprises utilizing at least one of an updated language module and an updated dictionary module to generate the text transcript of the audio content in the multimedia content.

2. The method of claim 1, further comprising:
determining one or more frames of the multimedia content; and
identifying the set of text frames from the one or more frames, wherein
the set of text frames are identified from one or more available portions of the text content within the one or more frames.

3. The method of claim 1, further comprising:
identifying the one or more off-topic keywords, wherein
the identifying the one or more off-topic keywords comprises clustering a distributional representation of the one or more keywords in the identified set of text frames, and
the one or more off-topic keywords comprising one or more repeated keywords in the set of text frames, numerals or keywords with one or more special characters, or both.

4. The method of claim 1, wherein the graph further comprises one or more edges, wherein
the one or more edges corresponding to a semantic relationship between a first node in the one or more first nodes and a second node in the one or more second nodes.

5. The method of claim 4, wherein each of the one or more first nodes that correspond to a keyword in the generated graph is associated with a predefined weight corresponding to a probability of occurrence of the keyword, and
each of the one or more second nodes that correspond to a keyword in the generated graph is associated with a predefined weight corresponding to a probability of occurrence of the keyword.

6. The method of claim 5, further comprising:
updating the predefined weight of each of the one or more first nodes and the predefined weight of each of the one or more second nodes in the generated graph.

7. The method of claim 6, wherein the updating of the predefined weight comprises determining a weight for each node of the one or more first nodes and the one or more second nodes using $$\min \Sigma(i,j) \in E |a_i - a_j|$$

where E corresponds to an extended keyword graph, $a_i$ corresponds to a weight by which a unigram probability estimate for keyword I is incremented, and $a_j$ is defined for keywords in set $M = L \cup D$, L and D correspond to nodes and edges.

8. The method of claim 7, wherein the determining of the weight is constrained by one or more of the following constraints $$a_i \geq a_j, \forall i = 1, \ldots, |L|, \forall j = 1, \ldots, |D|$$

$$a_k \geq 0, \forall k = 1, \ldots, M$$

$$\sum_{k=1}^{|M|} a_k \leq l$$

$$\sum_{i \in M} (p_i + a_i) + \sum_{j \in J} p_j - \frac{\sum_{k=1}^{|M|} a_k}{|J|} = 1$$

where $p_j$ corresponds to a unigram probability for keyword $j \in V$, wherein "V" denotes a language model vocabulary and |V| denotes vocabulary size,
L corresponds to the first set of keywords in "V" that are recognized from visual content in the multimedia;
D corresponds to the second set of keywords in "V" that are obtained after expanding keywords in "L";
|L|, |M|, |J|, and |D| correspond to a size of the first set of keywords and the size of the second set of keywords.

9. The method of claim 6, further comprising:
updating at least one of a language unit, a dictionary unit, or both, based on the updated predefined weight of each of the one or more first nodes and each of the one or more second nodes in the generated graph.

10. The method of claim 9, wherein the updating of the language unit corresponds to an update of a probability of occurrence of a keyword being spoken within the video content.

11. The method of claim 10, wherein the updating of the dictionary unit corresponds to an update of the one or more keywords in the dictionary unit.

* * * * *